INVENTORS
JAMES H. SHANE
ROBERT J. RUSSELL
BY RAYMOND A. BOCHMAN

ATTORNEY

INVENTORS
JAMES H. SHANE
ROBERT J. RUSSELL
BY RAYMOND A. BOCHMAN

ATTORNEY

United States Patent Office 3,494,382
Patented Feb. 10, 1970

3,494,382
CHEMICAL PRODUCTS AND PROCESSES
James H. Shane, Acton, Robert J. Russell, Framingham, and Raymond A. Bochman, North Reading, Mass., assignors, by mesne assignments, to Union Carbide Corporation, a corporation of New York
Original application Apr. 15, 1963, Ser. No. 273,245, now Patent No. 3,404,061, dated Oct. 1, 1968. Divided and this application Dec. 9, 1966, Ser. No. 619,094
Int. Cl. F16l 11/12, 9/16
U.S. Cl. 138—129                                    3 Claims

ABSTRACT OF THE DISCLOSURE

A tubular article comprising overlying layers of graphite material is provided. The graphite is characterized by being composed of graphite particles which have been expanded at least 80 times and then recompressed into an integral mass.

---

This is a division of application Ser. No. 273,245 filed Apr. 15, 1963, now Patent No. 3,404,061 dated Oct. 1, 1968.

This invention relates to graphite and more particularly to a novel form of graphite and to a process for producing the same.

A principal object of the invention is to provide flexible web material which consists essentially of graphite and which is essentially free of any binding or bonding material. Another object of the invention is to provide flexible graphite web material which possesses anisotropic or highly directional properties.

Another object of the invention is to provide binderless, flexible graphite sheet, paper, strip, tape, or the like which can have a density within the range of from about 5 pounds per cubic foot to about 137 pounds per cubic foot.

Another object of the invention is to provide flexible graphite web material from graphite particles which have been first appreciably expanded or intumesced and then compressed or compacted together.

Still another object of the invention is to provide flexible graphite web material from columinously expanded graphite particles which have a c direction dimension which is at least 80 times and preferably at least 200 times that of the original particles from which they are formed.

Still another object of the invention is to provide flexible graphite web material from vermiform graphite masses and an impregnant or additive.

A still further object of the invention is to provide flexible graphite products of the above types which have been physically modified.

Still another object of the invention is to provide flexible graphite web material having at least one embossed surface.

Still another object of the invention is to provide flexible graphite web material having at least one surface or side coated with an adhesive or cement or the like, or a metallic material such as aluminum, tantalum carbide, or the like.

Still another object of the invention is to provide laminate or composite structures comprising pliable graphite web material.

A still further object of the invention is to provide solid and hollow articles or products formed by wrapping, rolling, or otherwise working flexible graphite products of the above types.

Still another object of the invention is to provide fabrics or cloths formed from flexible graphite strips, yarns, strands, threads or the like.

Still another object of the invention is to provide a process for producing flexible graphite web material from voluminously expanded graphite particles.

Other objects of the invention will in part be obvious and will in part appear hereinafter.

The invention accordingly comprises the products possessing the features and properties and the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the drawings wherein.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size; the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties which are highly directional. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the *c* axis or direction and the *a* axes or directions. For simplicity, the *c* axis or direction may be considered as the direction perpendicular to the carbon layers. The *a* axes or directions may be considered as the directions parallel to the carbon layers or the directions perpendicular to the *c* direction.

Among the graphites which may exhibit or possess a high degree of orientation, mention may be made of natural graphites, Kish graphite and synthetic graphites such as for example, pyrolytic graphites. Natural graphites are generally found or obtained in the form of small, soft flakes or powder. Kish graphite is the excess carbon which crystallizes out in the course of smelting iron. The graphite separates as fine flakes and is very similar to flake natural graphite. Synthetic graphites are produced by the pyrolysis of thermal decomposition of a carbonaceous gas on a suitable substrate or mandrel heated at an elevated temperature. The graphite usually in the form of a massive, coherent deposit can be separated from the substrate in the form of coherent masses or bodies. If desired, the graphite masses can be pulverized, comminuted, shaved, or the like to produce synthetic graphite particles, e.g. powder, chip, flake, or the like of any desired size.

Synthetic graphites having a high degree of orientation and which are of particular interest are the so called pyrolytic graphites produced at temperatures between about 1500° C. and 3000° C. Pyrolytic graphites are essentially highly oriented polycrystalline graphites produced by high temperature pyrolysis techniques. Briefly, the pyrolytic deposition process may be carried out on a furnace wherein, at a suitable pressure, a hydrocarbon gas such as methane, natural gas, benzene, acetylene or the like is thermally decomposed at the surface of a substrate of suitable shape, size, and material, e.g. graphite, heated for instance, by appropriate induction or resistance means, to a temperature between about 1500° C. and 3000° C. and preferably between about 1900° C. and 2500° C. The pyrolysis is continued until pyrolytic graphite of the desired thickness is obtained. The substrate, if desired, may then be removed or separated from the pyrolytic graphite. Pyrolytic graphite material formed in the above manner is spectroscopically pure carbon, approaches theoretical density, and possesses a high degree of anisotropy.

Pyrolytic graphites prepared in the above manner only approach the true or ideal graphite structure. Although pyrolytic graphites have a high degree of preferred crystallite orientation, they do exhibit or display substantial disorder or random orientation between the carbon hexagon networks which lie parallel to one another. For example, pyrolytic graphites may exhibit interlayer disorder such as layer stacking defects or they may exhibit some rotational disorder. Pyrolytic graphites can be made or treated to reduce or eliminate defects such as those referred to above so as to form more or less ideal graphites. For instance, pyrolytic graphites having a high degree of preferred orientation can be produced by utilizing very high deposition temperatures. Likewise, disordered pyrolytic graphites can be converted or transformed to more perfect graphite structures by heat treating or annealing for a sufficient time above the deposition temperature. Moreover, graphitization of pyrolytic graphites can be achieved by the application of tensile strain in the basal plane direction while heating the same. The graphitization of pyrolytic graphites produce crystallites having a three dimensional order which more closely resembles a structure or lattice of ideal graphite.

As noted above, the bonding forces holding the parallel layers of carbon atoms together are only weak van der Waals forces. It has been found that graphites having a high degree of orientation such as, for example, natural graphites, Kish graphite and synthetic graphites, for instance, heat treated pyrolytic graphites can be treated so that the spacing between the superposed carbon layers or laminae can be appreciably opened up so as to provide a marked expansion in the direction perpendicular to the layers, that is, in the *c* direction and thus form an expanded or intumesced graphite structure in which the laminar character is substantially retained.

In U.S. Patents 1,137,373 and 1,191,383, natural graphite in the form of flake or powder of a size too great to pass through a 200 mesh screen is expanded by first subjecting the graphite particles for a suitable period of time to an oxidizing environment or medium maintained at a suitable temperature. Upon completion of the oxidizing treatment, the soggy graphite particles or masses are washed with water and then heated to between about 350° C. and 600° C. to more fully expand the graphite particles in the *c* direction. The oxidizing mediums disclosed are mixtures of sulfuric and nitric acids and mixtures of nitric acid and potassium chlorate.

By the above treatment, expansions of the natural graphite particles of up to about 25 times the original bulk were obtained. There is also disclosed that the expanded natural graphite can be compounded with a binder, e.g. a phenolic resin and the resultant composition compressed or molded into various forms, such as discs, rings, rods, sheets, etc.

It has been found that particulate graphite whether it be a natural flake or powder graphite, Kish flake graphite, or a synthetic graphite such as, for example, heat treated pyrolytic graphite in the form of chip, powder, flake, or the like which has been greatly expanded and more particularly expanded so as to have a final thickness or *c* direction dimension which is at least 80 or more times the original *c* direction dimension can be formed without the use of a binder or agglutinant into cohesive or integrated webs, e.g. sheets, papers, strips, tapes, or the like. The formation of graphite particles which have been expanded to have a final thickness or *c* dimension which is at least 80 times and preferably at least 200 times the original *c* direction dimension into integrated webs without the use of any binding material is believed to be possible due to the excellent mechanical interlocking, or cohesion which is achieved between the voluminously expanded graphite particles. Graphite particles which have been expanded to a degree somewhat less than 80 times the original thickness or *c* direction dimension do not exhibit the excellent mechanical interlocking properties required to form well integrated graphite web material which is free of any binder or bonding agent. In such cases, formation of graphite sheet material or the like can only be achieved through the use of binders. As noted in U.S. Patents 1,137,373 and 1,191,383, it was necessary that the natural graphite flakes and powders with expansions up to about 25 times the original bulk be compounded with a binder such as a phenolic resin in order to form sheets, rods, etc.

The web material formed from graphite particles having the desired degree of expansion also possesses substantial flexibility or pliability and can be made to have a density within the range of from about 5 pounds per cubic foot to a density approaching theoretical, that is, about 137 pounds per cubic foot.

In addition to the unique advantage of flexibility, the web material has also been found to possess an appreciable degree of anisotropy. Web material can be produced which has excellent flexibility, good strength and a high degree of orientation. Such highly oriented material possesses the excellent anisotropy or highly directional properties of pyrolytic graphite.

Briefly, the process of producing flexible, binderless graphite web material, e.g. sheet, paper, strip, tape, foil, mat or the like comprises compressing or compacting under a predetermined load and in the absence of a binder, expanded graphite particles which have a *c* direction dimension which is at least 80 times and preferably 200 times that of the original particles so as to form a substantially flat, flexible, integrated graphite web. It should be noted that the expanded graphite particles which generally are worm-like or vermiform in appearance once compressed will maintain the compression set. The density and thickness of the web material can be varied by controlling the degree of compression. The density of the web material can be within the range of from about 5 pounds per cubic foot to about 137 pounds per cubic foot. The flexible graphite web material exhibits an appreciable degree of anisotropy; the degree of anisotropy increasing with increasing density. In other words, the greater the density, the greater the degree of anisotropy possessed by the flexible graphite web material. In such anisotropic web material, the thickness, i.e. the direction perpendicular to the web surface comprises the $c$ direction and the directions ranging along the length and width, i.e. along or parallel to the surfaces comprises the $a$ directions.

The flexible graphite web material produced in the above manner can be modified in many ways. For example, in the formation thereof, impregnants or additives such as metal powders, clay, organic polymeric materials and the like can be incorporated or mixed with the expanded graphite and the composition compressed to form the desired web material. Likewise, one or both sides or surfaces of the soft, flexible graphite web material can be embossed, quilted, or otherwise provided with a pattern. One or both surfaces of the flexible graphite web material can be coated with a suitable material to provide reflectivity, oxidation resistance, wear resistance, additional strength or the like. For instance, the flexible web material can be provided with a thin coating of metal such as aluminum, gold, silver, or copper to provide a high reflectivity, low thermal conductivity material for cryogenic applications.

The flexible graphite web material can also be employed to form various laminate or composite structures. For example, at least one surface of the web material can be provided with an adhesive or with a suitable backing or carrier material to provide additional strength thereto. Additionally, the flexible graphite web material can be cut or slit into narrow strips which can be used to form woven or braided graphite fabric or cloth or the narrow strips can be formed into threads or strands which then can be used in the formation of graphite cloth or fabric. Furthermore, the flexible graphite web material as well as the graphite cloth or fabric can be suitably rolled or wound or otherwise worked to form solid or hollow structures.

More detailed descriptions of producing the flexible graphite products of the present invention are given in the following non-limiting examples which are set forth only for the purpose of illustration.

Example 1

A pyrolytic graphite mass produced at a deposition temperature of about 2100° C. was heat treated or annealed at a temperature of about 2800° C. for about 4 hours to provide a higher degree of preferred orientation or, in other words, to provide a well-ordered graphitic structure. The pyrolytic graphite mass was pulverized to form particles having a size between about one eighth of an inch and about one half of an inch.

The graphite particles were immersed in an oxidizing bath comprising 90 percent by volume of concentrated sulfuric acid (95–98%) and 10 percent by volume of concentrated nitric acid (36° B.) heated to about 100° C. The particles were maintained in the hot bath until they became soggy which was on the order of about 30 minutes. Upon removal from the bath, the soggy graphite particles were thoroughly rinsed with water and then subjected to a temperature of about 1000° C. to effect an almost instantaneous $c$ direction expansion thereof. In this run, the $c$ direction dimension of the expanded particles ranged from about 100 to about 300 times that of the original dimension. The expanded graphite masses which were still unitary structures were vermiform in appearance.

A predetermined height or thickness of the vermiform graphite masses was continuously deposited onto a travelling surface of substantial width and passed through a pair of superposed rolls; the spacing provided therebetween being sufficient to compress or compact the vermiform masses into a coherent, self-sustaining long flat sheet having a density on the order of about 10 pounds per cubic foot. The long, self-supporting sheet was then passed through another pair of superposed rolls; the spacing provided therebetween being adjusted to further compress the vermiform masses to the desired density and thickness. In this run, the sizing rollers were adjusted to provide a graphite sheet having a thickness of about 5 mils and a density of about 70 pounds per cubic foot. The thin, long, integrated graphite sheet formed was very flexible, of good strength, and possessed a high degree of anisotropy. The surfaces were smooth and had a metallic lustre.

Example II

A series of runs were made similar to that of Example I. However, in these runs, various sizes of suitable pyrolytic graphite particles were treated so as to produce vermiform pyrolytic graphite masses. Expanded graphite masses, having $c$ direction dimensions greater than about 80 times that of the original particle dimension were found to be capable of being pressed or rolled into integrated flexible sheet of various thicknesses and densities without the use of a binding or bonding agent.

The conditions of various runs and the expansions obtained are set forth below:

TABLE I

| Particle size | Bath composition | Bath temperature, °C. | Bath time (minutes) | Expansion |
|---|---|---|---|---|
| Finer than 40 mesh. | 90% by volume H$_2$SO$_4$ (66° B.), 10% by volume HNO$_3$ (36° B.). | Room temperature. | 5 | 100–300X |
| 30–40 mesh | ....do. | ....do. | 15 | 100–300X |
| 20–30 mesh | ....do. | ....do. | 15 | 100–300X |
| Coarser than 20 mesh. | ....do. | ....do. | 60–180 | 100–200X |
| Do | 75% by volume H$_2$SO$_4$ (66° B.) 25% by volume HNO$_3$ (36° B.). | 105° C. | 10 | 80–100X |

Example III

Natural graphite particles of a size sufficient to pass through a 200 mesh screen were immersed in an oxidizing bath comprising 90 percent by volume of concentrated sulfuric acid (95–98%) and 10 percent by volume of concentrated nitric acid (36° B.) maintained at room temperature. The particles were maintained in the bath for about 5 minutes. Upon removal from the bath, the soggy natural graphite particles were thoroughly washed or rinsed with water and subjected to a temperature of about 1000° C. to effect a substantially instantaneous $c$ direction expansion thereof. In this run, the $c$ direction dimension of the expanded natural graphite particles ranged from about 100 to about 300 times that of the original dimension. The expanded natural graphite masses which were still unitary structures were vermiform in appearance. A predetermined height or thickness of the vermiform natural graphite masses was continuously deposited onto a travelling surface or belt of substantial width and passed through a pair of superposed rolls predeterminedly spaced apart so as to compress the vermiform masses into a coherent self-supporting long flat sheet having a density on the order of about 10 pounds per cubic foot. The long, self-supporting sheet was then passed through a pair of superposed sizing rolls wherein the sheet was compressed and rolled to the desired thickness. In this run, the sizing rollers were adjusted to provide a graphite sheet having a thickness of about 10 mils and a density of about 60 pounds per cubic foot. The long, integrated graphite sheet possessed excellent flexibility and strength and a high degree of anisotropy. The surfaces were very smooth and had a metallic lustre.

Example IV

A series of runs were made similar to that of Example III. However, in these runs various grades or types of natural graphite flakes or powders (e.g. Ceylon graphite, Madagascar graphite, etc.) having sizes between about 10 and about 40 mesh were treated so as to produce vermiform natural graphite masses In these runs, expansions ranging from about 100 to about 500 and generally between about 200 to about 300 times that of the original $c$ direction dimension were obtained. These expanded graphite masses were found to be capable of being compressed or compacted into integrated flexible sheets of various thicknesses and densities without the use of any binding material. Flexible sheets of excellent quality were obtained from graphite masses having $c$ direction expansions greater than about 200 times.

Example V

A phenolic resin was blended with vermiform natural graphite masses having $c$ direction dimensions which were about 200 to about 300 times that of the original dimension. The quantity of phenolic resin used was about 30 percent by weight of the graphite masses. The composition or mixture was then compressed to produce a flexible "green" sheet having a thickness of about 10 mils and a density of about 100 pounds per cubic foot.

A summary of some of the properties of the flexible graphite web material of the present invention is set forth in the following table:

TABLE II

| | A [1] | B [1] | C [1] | D [2] |
|---|---|---|---|---|
| Physical Data: | | | | |
| Density, lbs./ft.$^3$ | 40-60 | 60-80 | 100-120 | 60-100 |
| Purity, percent | 99.9+ | 99.9+ | 99.9+ | |
| Ash content | 0.06 | 0.06 | 0.003 | |
| Gas permeability | Impermeable to helium at $10^{-5}$ mm. Hg | | | |
| Thermal data: | | | | |
| Thermal conductivity ("c" direction) B.t.u.-ft./ hr.-ft.$^2$-° F. at 1,000° F | 0.2-0.8 | 0.3-0.6 | 0.15-0.5 | 0.8-1.5 |
| Thermal shock resistance | Excellent | Excellent | Excellent | |
| Sublimation point, ° F | 6,600 | 6,600 | 6,600 | |
| Mechanical data (room temperature): | | | | |
| Ultimate tensile, p.s.i. | 450-600 | 800-1,200 | 1,700-3,200 | 500-700 |
| Elastic modulus tension, p.s.i.×10$^6$ | | 0.184 | 0.550 | |
| Electrical data (room temperature): Resistivity (microhm-cm.) "a" direction | | | 1,000 | |

[1] No impregnant or bonding material present.
[2] Impregnated with about 30% by weight of a phenolic resin.

Although only a limited number of examples are given above illustrating the expansion of graphite particles and the compression thereof to form flexible sheet material or the like, it should be pointed out that runs were carried out using wider ranges of expanding compressing conditions. In general, in the chemical treatment of natural graphite and heat treated pyrolytic graphite particles, particles of a wide range of sizes were subjected for periods of time ranging from about one minute to about 120 hours or more to a variety of oxidizing or intercalating solutions maintained at temperatures ranging from about room temperature to about 125° C. The graphite particles utilized can range in size from a dust or fine powder small enough to pass through a 325 mesh screen to a size such that no dimension is greater than about one inch. The concentrations of the various compounds or materials employed, e.g. $H_2SO_4$, $HNO_3$, $KMnO_4$, $FeCl_3$, etc. ranged from about 0.1 normal to concentrated strengths. Ratios of $H_2SO_4$ to $HNO_3$ were also varied from about 9 to 1 to about 1 to 1.

Interlayer attack of graphite particles is preferably achieved by subjecting the graphite particles to oxidizing conditions. Various oxidizing agents and oxidizing mixtures may be employed to effect controlled interlayer attack. For example, there may be utilized nitric acid, potassium chlorate, chromic acid, potassium permanganate, potassium chromate, potassium dichromate, perchloric acid and the like, or mixture such as, for instance, concentrated nitric acid and potassium chlorate, chromic acid and phosphoric acid, sulfuric acid and nitric acid, etc., or mixtures of a strong organic acid, e.g. trifluoroacetic acid and a strong oxidizing agent soluble in the organic acid used. A wide range of oxidizing agent concentrations can be utilized. Oxidizing agent solutions having concentrations ranging from 0.1 normal to concentrated strengths may be effectively employed to bring about interlayer attack. The acids or the like utilized with the oxidizing agents to form suitable oxidizing mediums or mixtures can also be employed in concentrations ranging from about 0.1 normal to concentrated strengths.

In one embodiment, the oxidizing medium comprises sulfuric acid and an oxidizing agent such as nitric acid, perchloric acid, chromic acid, potassium permanganate, iodic or periodic acids or the like. One preferred oxidizing medium comprises sulfuric and nitric acids. The ratio of sulfuric acid to oxidizing agent, and more particularly, nitric acid can range from about 9 to 1 or higher to about 1 to 1. Likewise, various sulfuric and nitric acid concentrations can be employed, e.g. 0.1 N, 1.0 N, 10 N and the like. Generally, the concentrations of the sulfuric acid and nitric acid which can be effectively utilized range from about 0.1 normal to concentrated strengths.

The treatment of graphite particles with oxidizing agents or oxidizing mixtures such as mentioned above is preferably carried out at a temperature between about room temperature and about 125° C. and for periods of time sufficient to produce a high degree of interlayer attack. The treatment time will depend upon such factors as the temperature of the oxidizing medium, grade or type of graphite treated, graphite particle size, amount of expansion desired and strength of the oxidizing medium.

It should also be briefly mentioned that the opening up or spreading apart of carbon layers can also be achieved by chemically treating graphite particles with an intercalating solution or medium so as to insert or intercalate a suitable additive between the carbon hexagon networks and thus form an addition or intercalation compound of graphite. For example, the additive can be a halogen such as bromine or a metal halide such as ferric chloride, aluminum chloride, or the like. A halogen, particularly bromine, may be intercalated by contacting the graphite particles with bromine vapors or with a solution of bromine in sulfuric acid or with bromine dissolved in a suitable organic solvent. Metal halides can be intercalated by contacting the graphite particles with a suitable metal halide solution. For example, ferric chloride can be intercalated by contacting graphite particles with a suitable aqueous solution of ferric chloride or with a mixture comprising ferric chloride and sulfuric acid. Temperature, times, and concentrations of reactants similar to those mentioned heretofore can also be employed for the above intercalation processes.

Upon completion of the treatment directed to promoting interlayer attack, the thoroughly wetted or soggy graphite particles can be subjected to conditions for bringing about the expansion thereof. Preferably, however, the treated graphite particles are rinsed with an aqueous solution. The rinsing or washing of the treated graphite particles with aqueous solutions may serve several functions. For instance, the rinsing or leaching removes harmful materials, e.g. acid from the graphite particles so that it can be safely handled. Moreover, it may decompose or remove intercalated material. Furthermore, it can also serve as the source of the blowing or expanding agent which is to be incorporated between layers. For example, it can serve as the source of water if such is to be utilized as the blowing or expanding agent.

The $c$ direction expansion is brought about by activating a material such as, for example, a suitable foaming or blowing agent which has been incorporated between layers of parallel carbon networks, the incorporation taking place either during the interlayer attack treatment or thereafter. The incorporated foaming or blowing agent upon activation such as by chemical interaction or by heat generates a fluid pressure which is effective to cause $c$ direction expansion or intumescence of the graphite particles. Preferably, a foaming or blowing agent is utilized which when activated forms an expanding gas or vapor which exerts sufficient pressure to cause expansion.

A wide variety of well-known foaming and blowing agents can be employed. For example, there can be utilized expanding agents such as water, volatile liquids, e.g. liquid nitrogen and the like which change their physical state during the expansion operation. When an expanding agent of the above type is employed, the expansion of the treated graphite particles is preferably achieved by subjecting the treated graphite particles to a temperature sufficient to produce a gas pressure which is effective to bring about an almost instantaneous and maximum expansion of the particles. For instance, when the expanding agent is believed to be water, the graphite particles having water incorporated in the structure are preferably rapidly heated or subjected to a temperature above 100° C. so as to effect a substantially instantaneous and full expansion of the graphite particles. If such particles to be expanded are slowly heated to a temperature above 100° C., substantial water will be lost by vaporization from the structure resulting in a drying of the structure so that little or no expansion will be achieved. Preferably, the substantially complete and full expansion of the graphite particles is accomplished within a time of from about a fraction of a second to about 10 seconds.

In addition to physical expanding methods such as described above, the expanding gas can be generated in situ, that is, between layers of carbon networks by the interaction of suitable chemical compounds or by the use of a suitable heat sensitive additive or chemical blowing agent.

As indicated previously, the graphite particles are so treated with a suitable oxidizing medium and unrestrictedly expanded that there is preferably produced expanded graphite masses having expansion ratios of at least 80 to 1 or higher. In other words, the expanded graphite particles have a thickness or $c$ direction dimension which is at least 80 times that of the original $c$ direction dimension. The expanded graphite particles are unitary, laminar structures having a vermiform appearance. The vermiform masses are pure, lightweight, anisotropic graphite.

Additionally, the expanded or vermiform graphite masses are chemically inert to most reagents, have excellent dimensional stability, and very low thermal expansion. One very important characteristic exhibited by such masses is that they are easily compressed under load and will maintain the compression set.

In addition to graphite particles, other materials having a high degree of orientation and anisotropy can also be expanded. For example, particles of alloys of graphite, boron nitride and alloys thereof can also be expanded and flexible web material formed therefrom. Graphite alloy particles and more particularly, pyrolytic graphite alloy particles can be treated, expanded, and compressed in substantially the same manner as heretofore described for substantially pure graphite particles.

Boron nitride has a crystal structure similar to that of graphite. To attack the bonding forces between the layers so as to form openings, holes, or spaces for the introduction of a suitable expanding agent, e.g. water, the boron nitride can be initially treated with a solution of, for example, ferric chloride, aluminum chloride, antimony trichloride, arsenous chloride, or cuprous chloride. Subsequent to such treatment, the boron nitride can be processed and expanded and then recompressed in manners similar to those described above for graphite.

The formation of flexible graphite sheet, strip, paper, tape or the like from expanded graphite particles and modifcations of such will be more fully set forth in connection with the description of the drawings.

Figure 1:
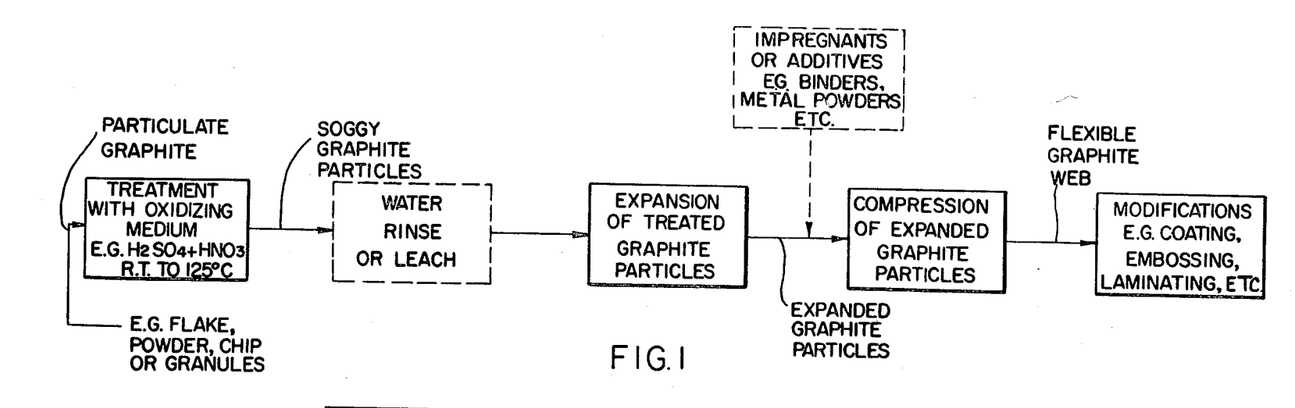
FIG. 1 is a flow sheet illustrating a series of steps embodying the present invention.

Referring now to FIGURE 1, there is illustrated a flow sheet which sets forth one method of forming flexible graphite web material from graphite particles and modifications which may be made to such flexible graphite web material. As shown, graphite particles in the form of flake, powder, chip, granules or the like having a high degree of preferred orientation are subjected to interlayer attack to form openings between the layers of carbon networks. The interlayer attack is preferably achieved by subjecting the graphite particles to an oxidizing medium such as a mixture comprising sulfuric acid and nitric acid. After the graphite particles have become thoroughly wetted and preferably quite soggy, they are removed from the oxidizing medium, and then rapidly heated or subjected to a temperature above 100° C. so as to substantially instantaneously effect a full $c$ direction expansion of the graphite particles. If desired, the soggy particles, after removal from the oxidizing medium, can be thoroughly leached or rinsed with water and then expanded. Predetermined quantities of the expanded or worm-like graphite masses having the desired degree of expansion are then compressed or compacted together, in the absence of any binder, so as to form a flexible, integrated graphite web material having a desired thickness and density. If desired, the expanded graphite particles before being compressed can be mixed or blended with a suitable impregnant or additive so as to modify the nature or structure of the flexible graphite web material. The flexible graphite web material thus formed can be used as such as it can be further treated or worked, e.g. coated, embossed, laminated, etc. so as to impart additional properties or characteristics thereto. The modications and uses of the flexible graphite web material will be discussed hereinafter in more detail.

Figure 2:
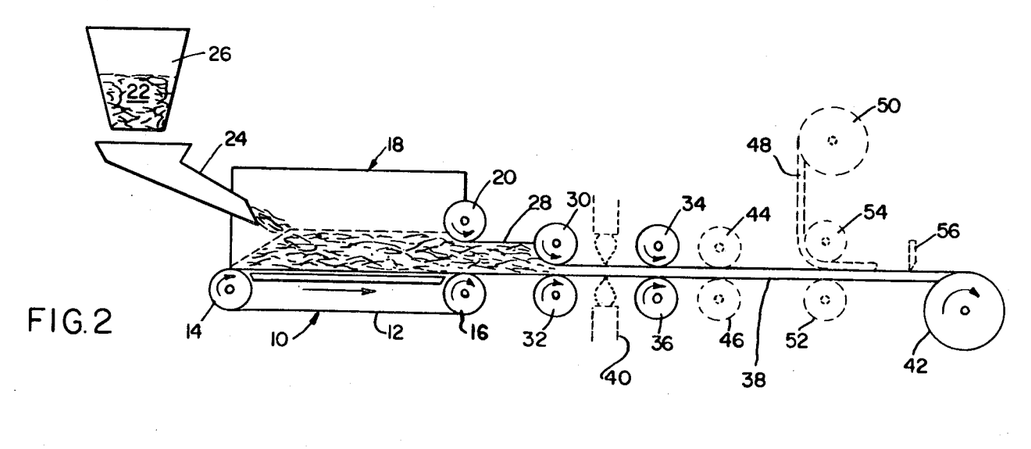
FIGS. 2 and 3 are diagrammatic views illustrating means for forming flexible web material such as sheet, paper, strip, tape or the like from expanded or in intumesced graphite particles.

Referring now to FIGURE 2, there is shown one means for continuously forming a flexible graphite web material from expanded or vermiform graphite masses. The apparatus shown comprises a conveyor 10 consisting of an endless belt 12 of a suitable material, e.g. hard rubber, metal, or the like and a pair of spaced rolls or rollers 14 and 16 in horizontal axial alignment around which belt 12 moves or travels. The conveyor is also provided with side walls, only one side 18 being shown. Predeterminedly spaced above and in vertical axial alignment with roll 16 is roll 20.

The vermiform graphite masses 22 having a $c$ direction dimension or thickness which is at least 80 times and preferably at least 200 times that of the particles from which were formed are fed or deposited at a predetermined rate onto the surface of the traveling belt 12 by means of an electrically controlled vibrating feeder 24 which is located below and in connection with storage hopper or bin 26. The expanded graphite particles 22 deposited onto the traveling belt surface which is moved at a predetermined rate can all be of substantially the same size or of different sizes. Likewise, the graphite masses fed onto the belt can all have substantially the same degree of expansion, e.g. all with expansion ratios on the order of about 300 to 1 or have different expansions, e.g. the feed can comprise a mixture of graphite masses having expansion ratios of 100 to 1, 300 to 1, and 500 to 1 or the like. It should also be noted that the feed 22 may also consist of a mixture or composition comprising of, for example, expanded graphite particles mixed or blended with an impregnant, e.g. a phenolic resin, or other organic material; or an additive such as clay particles, metal powder, or other suitable inorganic material. As conveyor means 10 travels at a desired rate in the direction shown, predetermined quantities of the expanded graphite particles or masses 22 are continuously deposited onto the traveling belt 12, between the confining side walls and settle thereon to a thickness according to the speed of travel of belt 12. The slower the speed, the greater the thickness or deposit. The resultant continuous thick bed of expanded particles 22 is passed or carried between pressure rolls 16 and 20. The spacing between roll 20 and the belt 12 at this point is controlled or adjusted such that the expanded particles are sufficiently compacted or compressed as to form a self-supporting web 28 having a thickness which is somewhat greater and a density which is somewhat less than that ultimately desired. Of course, the above spacing can be such that the expanded particles are compressed to the thickness and density desired for the web material. Preferably, however, two or more compression steps or stages are utilized to compact and bond the expanded particles together and to form a web material having the desired thickness and density.

The coherent, self-supporting web material 28, is then passed between at least one pair of predeterminedly spaced superposed pressure or sizing rolls. As shown, two pairs of sizing rolls are provided. Sizing rolls 30 and 32 and sizing rolls 34 and 36 are both provided with the same spacing therebetween so as to finally compress or reduce web material 28 to a web material 38 having the desired thickness and density. A plurality of pairs of sizing rolls is preferably employed so as to produce a smoother web of more uniform thickness and density. In order to further insure the production of a smooth web of uniform thickness and density, the web material, after being pressed or molded to the desired thickness and density, can be subjected to a suitable elevated temperature so as to remove residual fluid in the web and to cause re-expansion of compressed particles such as those not previously fully expanded, and the heat treated web then recompressed or sized. As shown in FIGURE 2, suitable heating means 40 illustrated in dotted lines is provided between the pairs of sizing rolls. Web 38 after passing through sizing rolls 30 and 32 is subjected to an elevated temperature, e.g. 1000° C. so as to cause re-expansion of compressed particles which were not previously completely expanded or which contain residual fluid, e.g. moisture. The heat treated web which may be somewhat puffed is then re-rolled to the desired thickness and density by sizing rolls 34 and 36. If desired, the web material can be subjected to more than one heat treatment and re-rolling operation. The finished integrated web 38 after passing through sizing rolls 34 and 36 can then be taken up on a suitable reel or spool 42. The various rolls utilized are suitably driven by means which are not shown. Means (not shown) for controlling the speed of conveyor 10 and the feed of expanded graphite particles to the traveling surface are also provided so that web material of a wide range of thicknesses and densities and with a high degree of thickness and density uniformity can be produced.

It should be noted that instead of utilizing roll 20 in conjunction with conveyor 10, an endless belt means may be used instead. For instance, such a belt means may be positioned above conveyor 10 and at an angle thereto such that the expanded graphite particles carried therebetween are progressively or gradually compressed together. Likewise, the expanded graphite particles may be compressed by suitable step pressing means. Additional pairs of pressure or compressing rolls having varying spacings therebetween may precede sizing rolls 30 and 32 so that web 28 comprising partially compressed expanded particles may be gradually or stepwise reduced or compressed. Although the use of two pairs of sizing rolls is illustrated, it should be pointed out that only one such pair may be employed or more than two pairs may be utilized.

If desired, web modifying means may be included in the web production line. For example, one or both surfaces of web 38 can be embossed or otherwise marked or deformed by utilizing one or two embossing rolls as the case may be as the final compressing or sizing rolls or by positioning one or more embossing rolls after the sizing rolls as shown by dotted rolls 44 and 46 in FIGURE 2. For instance, if it is desired to emboss only the top or upper surface of web 38, then roll 46 will be provided with a smooth surface while roll 44 will be provided with the pattern or marking to emboss the top surface.

Laminated structures or composites may be obtained by combining web 38 with a suitable sheet material 48. As shown in dotted lines in FIGURE 2, a suitable web material 48, for example, adhesively backed paper may be supplied from a supply reel or spool 50 and is bonded over the web 38 as the superposed webs pass between guide and pressure rolls 52 and 54. Obviously, if it is desired only to provide an adhesive coating to one or both surfaces of web 38, suitable adhesive coating means, e.g. roll coaters or the like may be provided. It should also be mentioned that the web material 38, whether it be smooth surfaced, embossed, provided with an adhesive coating or laminated or bonded to other suitable materials can be slit or cut by knife or slitting means 56 shown in dotted lines to form strips, ribbons, tapes, strands, or the like of any desired width and length.

Figure 3:
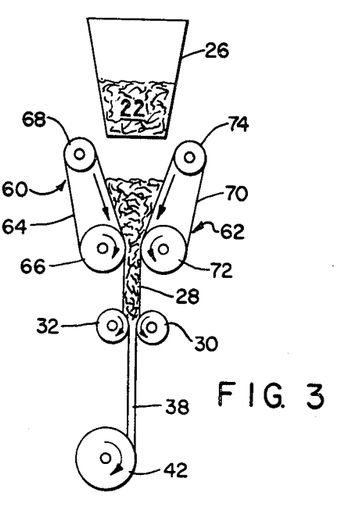

Referring now to FIGURE 3 wherein like numbers refer to like elements or parts of FIGURE 2, there is shown a pair of belt conveyors 60 and 62 having a V-shaped arrangement. Belt conveyor 60 comprises an endless belt 64 which travels around spaced rolls 66 and 68. Belt conveyor 62 comprises an endless belt 70 which travels around spaced rolls 72 and 74. Sides (not shown) are provided between the conveyors so as to confine the expanded particles therebetween.

In this case, the expanded graphite particles 22 from storage hopper 26 are fed between the moving belts 64 and 70 and are gradually or progressively pressed or compacted together as they are moved downwardly between the conveying belts. The spacing between the belts at the lower ends thereof is adjusted or controlled so that the expanded particles are compressed as to form a coherent, self-supporting web 28 having the desired thickness and density or preferably having a thickness which is somewhat greater and a density which is somewhat less than that ultimately desired. This sheet can then be further worked or treated in any one or more of the ways described in FIGURE 2.

Figure 4:
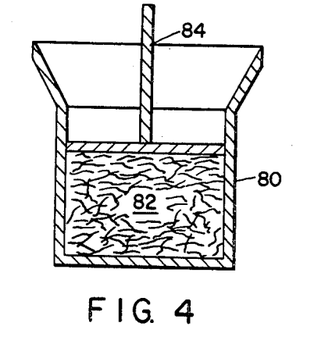
FIG. 4 is a sectional view also illustrating means for forming flexible web material from expanded or intumesced graphite particles.

FIGURE 4 illustrates a simple means for forming web material. In this embodiment, a female die 80 is charged with a predetermined quantity of expanded particles 82 e.g. graphite having the desired expansion and punch 84 is forced downwardly to compress the expanded particles in the die cavity to the desired thickness or degree.

The expanded graphite particles heretofore described are lightweight, anisotropic, vermiform masses which are easily compressed under load and which maintain the compression set.

As described above, graphite particles having a c direction dimension expansion of at least 80 times and preferably 200 times or more can be compressed into flexible thoroughly cohesive integrated web material without the use of any binder or bonding agent. In the formation of binderless, flexible graphite web material, the compressing operation flattens the volunminously expanded graphite particles causing them into inter-engagement with each other. The strong mechanical bond formed by the interlocking or inter-engagement of an enormous number of carbon layers and the effective natural cohesive forces or adhesive properties of the graphite make it possible to obtain a flexible, integrated graphite web material of good strength. It has been found that web material having excellent strength and a very high degree of flexibility can be formed from graphite particles having a c direction dimension expansion of at least 200 times. It can be generally stated that the greater the degree of expansion in the masses used to form the web material, the better the quality of the web material. Moreover, the preferred expanded particles are flattened or squeezed in such a manner upon compression that the web material possesses an appreciable degree of crystallite orientation and anisotropic properties. The flexible graphite web material of the invention has been found to possess or exhibit an appreciable degree of anisotropy; the degree of anisotropy increasing with increasing density. In the anisotropic, flexible graphite web material, the c direction is the direction perpendicular to the surface plane, that is, the thickness direction and the a directions are the directions along the surface plane, that is, the width and length directions.

The pliant, graphite web material possesses chemical inertness, thermal stability, high purity, and non-wettability. It can also be made to possess fluid impermeability. It possesses either low or high thermal conductivity, dependent upon the orientation. Preliminary measurements of the graphite web material have indicated c direction thermal conductivities of less than about 1.0 B.t.u.-ft./hr.-ft.$^2$-° F. at 1000° F. which is lower than that of pyrolytic graphite or any other available high temperature insulation. Thus, the graphite material of the present invention possesses the unique advantage of flexibility, in addition to excellent thermal insulating properties from the cryogenic range up to 6700° F. A very effective insulating barrier is thus available in a very small space. The a direction thermal conductivity of the graphite web material is in the range of 140–150 B.t.u.-ft./hr.-ft.$^2$-° F. at 1000° F. which is approximately equal to pyrolytic graphite. In addition to anisotropic thermal properties, the web material also possesses anisotropic electrical properties. The strength of the flexible graphite material depends upon several factors. However, generally it can be stated that flexible graphite material having room temperature tensile strengths ranging from about 250 to about 3200 p.s.i. and higher can be produced.

Graphite web material of indefinite and commercial lengths and of a wide range of widths, thicknesses, and densities, can be continuously produced. The supple graphite web material can be provided with a uniform thickness in the range of from about 0.0001 inch (0.1 mil) to about 0.500 inch (500 mils). The densities of the graphite materials can range from about 5 pounds per cubic foot to about 137 pounds per cubic foot. Flexible graphite web materials having a density within the range of from about 40 to about 100 pounds per cubic foot have been found to possess very desirable flexibilities, strengths, and anisotropics.

The flexible graphite materials of the present invention find a wide range of uses. For example, the graphite material can be used as an insulating material and/or as a thermal conductive material. It can also be used to form graphite fabrics or cloth or to fabricate various shapes or structures such as for instance, bricks, blocks, plates, tubes, or the like. High temperature, chemically inert gaskets, rupture discs, or the like can be made by cutting out the desired shape from a suitable thickness of flat stock material. It can also be used as resistance heating elements and as radiation shields. The flexible graphite web material can be modified to provide many additional useful applications.

While the flexible web material can be pure graphite free of any binders or additives, suitable organic and inorganic materials can be incorporated therein so as to modify the nature or properties thereof. For example, the expanded graphite particles can be impregnated with various amounts of a polymeric material and the composition compressed to form the desired flexible material. Thus, it can be impregnated with a thermoplastic resin such as cellulose or cellulose acetate or with a thermosetting resin such as an epoxy resin or a phenolic as phenol-formaldehyde. When a heat-curable impregnant or binder, e.g. a phenolic resin is utilized, the binder can be cured or hardened by suitably heating the compressed product. When an organic impregnant or binder is present with the graphite in the compressed product, if desired, such product can be subjected to a suitable elevated temperature so as to effect carbonization of the organic impregnant and thus form a substantially all carbon product. It should be noted that with the use of an impregnant or additive, flexible graphite web materials having appreciably high densities can be obtained. Thus, it is possible to produce graphite webs having densities above about 137 pounds per cubic foot.

In addition to organic materials suitable inorganic materials can also be incorporated or mixed with the expanded graphite particles and the composition then compressed to the desired product. For example, the compressed product may have incorporated therein particulate or fibrous materials such as a metal powder or filaments, fibrous reinforcing materials, e.g. fiber glass, clays, or the like. The inclusion of such materials may be to reinforce or strengthen the compressed product or to otherwise modify the properties thereof, for example, make the web magnetic, increase the electrical conductivity, or the like.

Figure 5:
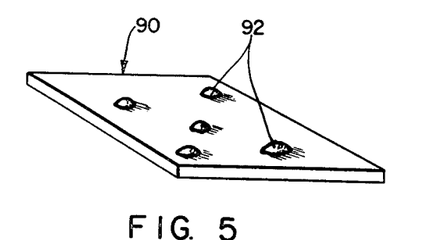
FIG. 5 is a perspective view of a flexible graphite web material, e.g. paper, having an embossed surface.

The flexible graphite web material of the present invention can be treated so as to deform one or both surfaces thereof. For example, the soft material can be easily embossed or otherwise marked or deformed by well known means. As shown in FIGURE 5, one surface of material 90 is smooth while the other surface is provided with a plurality of protuberances 92.

In addition, the flexible products of the invention can be suitably coated. For example, a suitable adhesive coating e.g. a pressure sensitive adhesive can be provided on at least one face or surface, of say, a flexible graphite sheet which then can be slit into narrow strips to provide a flexible, adhesive thermal insulating tape, or a flexible adhesive tape for use in the fabrication of shapes such as tubular articles or the like.

Likewise, coatings of metallic materials, for example, metals, carbides, oxides, or the like can also be applied by well known techniques to provide reflectivity, additional strength, oxidation resistance, wear resistance, or the like. For instance, flexible graphite strands can be coated with tantalum carbide and used as filaments in incandescent lamps of the type disclosed, for instance, in U.S. Patents 3,022,438 and 3,022,439. The flexible graphite sheets can be provided with a thin, highly reflective metal coating such as aluminum, gold, silver, or copper to provide a highly reflective, low thermal conductivity, material for cryogenic applications such as shown in FIGURE 6.

Figure 6:
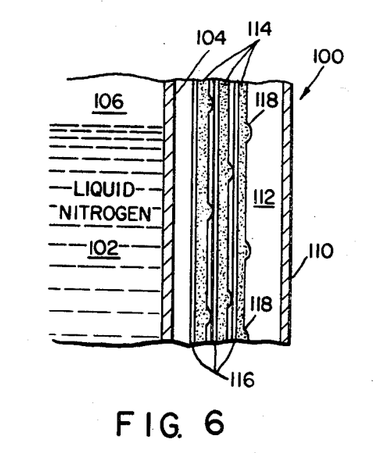
FIG. 6 is a diagrammatic, schematic view illustrating a cryogenic container utilizing flexible graphite web material, e.g. sheet having one surface embossed and one surface coated with a reflective coating, e.g. aluminum as the insulating material.

In FIGURE 6, there is shown a portion of a vessel 100 for carrying a cryogenic fluid 102 such as, for example, liquid nitrogen. This vessel comprises an inner container 104, for carrying the cryogenic fluid in a space 106. Only one wall of inner container 104 is shown for simplicity of illustration. If the cryogenic fluid is liquid nitrogen, then the fluid 102 will be at a temperature of 77° K. and at atmospheric pressure due to a suitable vent (not shown). An outer container 110 encloses the inner container 104 and defines therewith a space 112 which may be evacuated through a suitable outlet (not shown) to a pressure of less than about 1 micron Hg abs., when the temperature of the wall of the inner container 104 is less than about 100° K. A plurality of layers of flexible graphite web material 114 are provided in space 112 so that the $c$ direction thereof is normal to the walls of containers 104 and 110. The graphite layers can be suitably wound about the wall of the inner container. One surface of each of the flexible graphite webs 114 is provided with a metal coating 116 such as aluminum. The other surface of each of the flexible graphite webs 114 is embossed to provide a plurality of protuberances 118 thereon so that only point contact will be provided from one layer to the other. In other words, the protuberances 118 prevent the graphite layers from having extensive area of planar contact and eliminate the necessity of spacer elements. In view of the very low thermal conductivity in the $c$ direction of each of the graphite layers, and the use of a highly reflective metal coating, the layers 114 serve as very effective radiant heat barriers.

Figure 7:
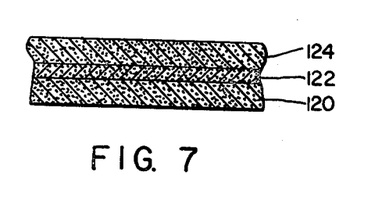
FIG. 7 is an enlarged cross-sectional view of a composite or laminate structure employing flexible graphite web material, e.g. strip or sheet.

The flexible graphite web material can also be employed to form various laminate or composite structures. For instance, utilizing FIGURE 7 to illustrate various embodiments, there can be provided a laminated structure comprising two flexible graphite webs 120 and 124 adhered together by a suitable binder or adhesive 122. The webs can be bonded together by a binding or bonding agent such as tar, pitch, a carbon cement, or suitable thermosetting synthetic resin adhesive, e.g. a phenolic resin or the like so that, if desired, the agent can be carbonized so as to form a substantially all carbon product. Instead of web 124 being similar to web 120, it can be of a dissimilar material. For instance, it can be of a flexible, fibrous or dissimilar non-fibrous material such as paper, cloth, or fabric, synthetic polymeric material or the like. For example, graphite web 120 can be bonded by means of a thin adhesive layer 122 to a suitable backing material such as cloth, e.g. fiber glass or the like to provide additional strength to the graphite web. Likewise, graphite web 120 may be combined with a carrier sheet or tape, e.g. paper having an adhesive which is more adhesive than cohesive so that upon removal or stripping of the paper therefrom, the adhesive material transfers from the paper and adheres to the graphite web 120 thus producing an adhesively backed flexible graphite web.

Figure 8:
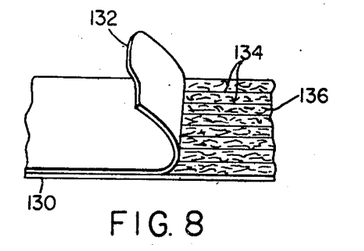
FIGS. 8 and 9 are perspective views of other laminate structures employing flexible graphite web material.

The strength of a flexible graphite sheet or strip can be increased by providing a laminate comprising two superposed flexible graphite layers bonded together and having therebetween suitable strengthening means such as strings, threads, web-like material or the like. FIGURE 8 represents a composite or laminated structure comprising two flexible graphite webs 130 and 132. These webs are bonded together by a suitable adhesive 136 in which is embedded a series or plurality of longitudinally disposed filaments 134 extending side by side in approximate parallelism. The filaments or strands may be of metal, glass, flexible graphite, or the like.

Figure 9:
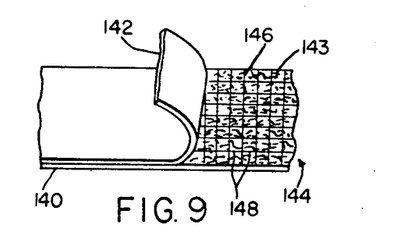

FIGURE 9 represents another two-ply composite structure comprising two webs 140 and 142 of flexible graphite material. These webs are laminated together by a suitable adhesive 143 in which there is embedded a material 144 which comprises transverse threads 146 and longitudinal threads 148. The material 144 may comprise woven metal threads or filaments, woven glass fabric, woven flexible graphite strands or thread or the like.

The flexible graphite web material and flexible graphite cloth or fabric can be rolled, wrapped, pressed or otherwise worked or formed to any shape desired. Thus, it is possible to provide structural shapes of any desired thickness, rigidity, and density. Suitable organic and inorganic binders can be utilized in the building of such shapes or structures. For example, a thick graphite sheet or plate of say, a thickness of one inch and of a low density can be formed or built-up by suitably laminating together a desired number of superimposed layers of low density flexible graphite web material. Solid articles or objects can be made from such a laminated structure by utilizing well known machining techniques or the like.

Figure 10:
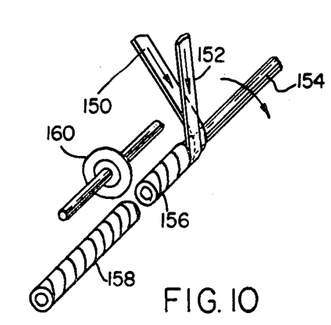
FIG. 10 is a view illustrating one embodiment for fabricating hollow or cylindrical structures from flexible graphite strip or tape.

Laminated hollow or tubular structures can be provided by winding flexible graphite web material in the form of strip, tape, or the like around a suitable mandrel or substrate or by otherwise conforming the material to a desired form. As shown in FIGURE 10, two overlying tapes or strips 150 and 152 of flexible graphite material are spirally wound about mandrel 154. Obviously, if a thicker wall is desired for the tubular structure, more than two overlying graphite plies or strips are wound about mandrel 154. The strips may be wound without the use of any adhesive to secure them together and after winding coated with a suitable material so as to adhesively unite the strips and to provide a coherent, self-supporting rigid structure. Likewise, the strips may be adhesively backed so that the strips are bonded together as they are wound about the mandrel. The wound tube 156 issuing from the mandrel 154 may then be cut into the desired lengths 158 by knife means 160. Tubes comprising a spirally wound tubular body member formed from a plurality of overlying plies or strips of flexible graphite material find many uses. For example, such tubes can be used as piping for confining or conveying molten metals or other materials or for conforming hot gases or the like.

Figures 11, 12:
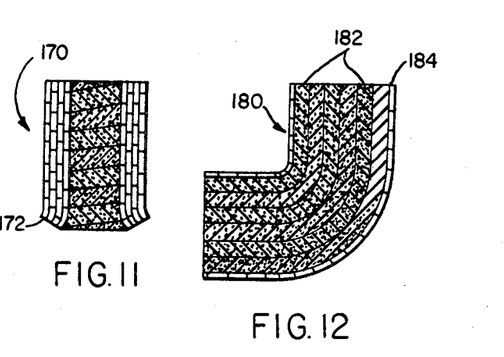
FIGS. 11 and 12 are cross-sectional views of hollow articles or products formed from flexible graphite strip or tape.

FIGURE 11 shows a cross-section of a tube 170 produced in the manner of FIGURE 10 so as to be provided with a slight flare 172 at one end thereof. Such a tube of a low density and hence of light weight finds particular use as a blast tube in space vehicles. The overlying strips or tapes are spirally wound so that the junctions or seams in the lower layers are covered.

FIGURE 12 illustrates another manner in which tubular members may be constructed. In this embodiment there is shown a tubular elbow 180 having an inner layer 182 comprising flexible graphite strip or tape material which runs longitudinally of the elbow. An outer layer 184 is spirally wound or wrapped around layer 182.

Thin, flat, flexible graphite web material can be cut or slit into very narrow strands or strips which can be woven, braided, or otherwise formed into a graphite fabric or cloth. Likewise, a strip of suitable width can be cut from thin, flexible graphite web material and twisted or otherwise spun about its longitudinal axis or about an axis lying at an angle to the longitudinal axis of the strips to form a compact flexible thread, yarn or strand of substantially cylindrical cross section. Threads or yarns thus formed can be woven, braided or otherwise worked into a fabric or the like or two or more of such threads can be plaited or twisted with each other or with other materials to form a strand or filament of larger cross section.

Figures 13, 14, 16:
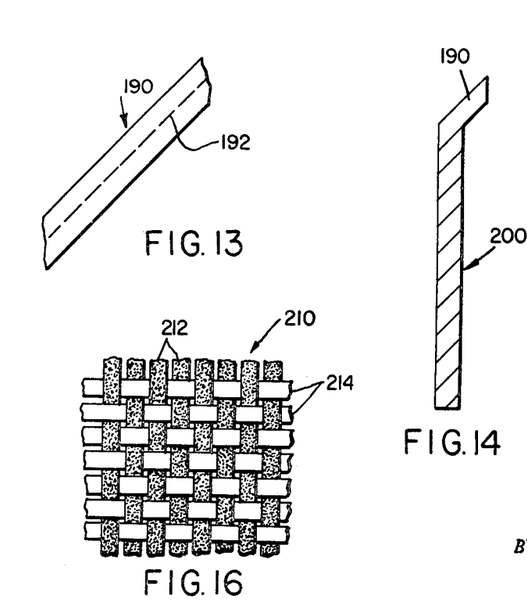
FIG. 13 represents a flexible graphite strip from which threads, strands, or yarns can be prepared.
FIGS. 14 and 15 illustrate a portion of a strand of flexible graphite material formed by suitably twisting the strip of FIG. 13.
FIG. 16 illustrates a portion of a fabric formed by weaving strips, threads, or strands of flexible graphite material.
Figure 15:
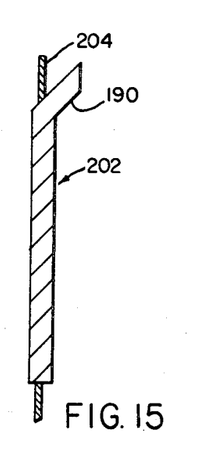

FIGURE 13 designates a strip of flat, thin, flexible graphite material 190 which can be twisted about itself or a suitable core to form a strand or thread. The longitudinal axis of the strip is designated by the dotted line 192. In FIGURE 14, there is shown a strand 200 formed by suitably folding strip 190 along the line 192, doubling each of the folded portions back upon itself and then twisting the resulting strip on a line lying at an angle to the longitudinal axis. A somewhat similar strand can be formed by twisting the resulting strip around its longitudinal axis. In FIGURE 15, a strand 202 is prepared by twisting strip 190 around a core of extraneous material 204. The core 204 may be stiff material or it may be flexible. For example, core 204 may be a metallic wire or strand, glass fiber, a textile material such as a twine of cotton, jute, or the like. The core material 204 is laid along the line 192 of strip 190 and the strip is twisted about the material, or it may be placed in other positions upon the strip and the strip wrapped therearound as a tape.

There are many other ways of utilizing strip 190 to form strands or threads. For instance, a strand may be formed by merely twisting graphite strip 190 across its breadth so that the line of twist follows the longitudinal axis of the strip or strip 190 may be twisted along an axis lying at an angle to the line 192. Likewise, strip 190 can be rolled or convolved upon itself starting with either longitudinal edge and the strand then twisted.

The threads or strands of graphite material formed in any of the above described ways can be woven into lightweight, pliable graphite fabric or cloth. A portion of such a fabric 210 is illustrated in FIGURE 16. In this figure, the warp 212 and the weft 214 are both formed of strands of flexible graphite material. However, it should be pointed out that a fabric can be formed by using either a warp or weft of graphite material in combination with a warp or weft of extraneous material such as a textile material, e.g. cotton, twine, etc., metal wire, or the like. Additionally, it should be noted that a braided fabric or cloth can be formed from warp strands of graphite material and suitable braiding strands. The warp and braiding strands can both be graphite material, or one can be of extraneous material as mentioned above. The woven or braided graphite fabric or cloth can be used to form structures of various shapes, e.g. tubular structures or the like, or they can be used as lightweight, pliable microwave shielding materials.

As used in the specification and claims, the terminology "graphite web" is intended to include within its meaning graphite in the form of flexible sheets, strips, papers, tapes, foils, films, mats or the like. The term "graphite web" thus includes within its meaning substantially flat, flexible, graphite material or stock of any length and width.

Since certain changes may be made in the above products and processes without departing from the scope of the invention herein involved, it is intended that all matter contained in the above description should be interpreted as illustrative and not in a limiting sense.

What is claimed is:

1. A tubular body comprising a plurality of overlying layers of graphite web material, said graphite web material comprising expanded graphite particles compressed together, said expanded graphite particles having a $c$ direction dimension which is at least 80 times that of the graphite particles from which said expanded graphite particles are formed.

2. A tubular body comprising a plurality of overlying layers of graphite web material, said graphite web material comprising expanded graphite particles compressed together in the absence of a binder, said expanded graphite particles having a $c$ direction dimension which is at least 80 times that of the graphite particles from which said expanded graphite particles are formed.

3. The tubular body of claim 2 wherein the overlying layers of graphite web material are spirally wound.

References Cited

UNITED STATES PATENTS

| | | | |
|---|---|---|---|
| 1,137,373 | 4/1915 | Aylsworth | 252—511 |
| 1,191,383 | 7/1916 | Aylsworth | 252—378 |
| 2,179,057 | 11/1939 | Schuetz | 138—148 |
| 3,107,152 | 10/1963 | Ford et al. | 23—209.2 |
| 3,138,434 | 6/1964 | Diefendorf | 23—209.1 |
| 3,174,895 | 3/1965 | Gibson et al. | 161—259 |

LAVERNE D. GEIGER, Primary Examiner

IRA C. WADDEY, Jr., Assistant Examiner